United States Patent [19]

Sanders, Jr.

[11] Patent Number: 4,794,387
[45] Date of Patent: Dec. 27, 1988

[54] ENHANCED RASTER IMAGE PRODUCING SYSTEM

[76] Inventor: Royden C. Sanders, Jr., P.O. Box 550, Hillsborough Mills/Elm St., Wilton, N.H. 03086

[21] Appl. No.: 815,984

[22] Filed: Jan. 3, 1986

Related U.S. Application Data

[63] Continuation-in-part of Ser. No. 799,843, Nov. 18, 1985.

[51] Int. Cl.⁴ .............................................. G09G 1/16
[52] U.S. Cl. .................................... 340/728; 340/720; 340/748
[58] Field of Search ................. 340/728, 744, 748, 720

[56] References Cited

U.S. PATENT DOCUMENTS

| | | | |
|---|---|---|---|
| 2,921,124 | 1/1960 | Graham | 340/728 |
| 3,403,289 | 9/1968 | Garry . | |
| 3,418,518 | 12/1968 | Reese, Jr. | 340/728 |
| 3,437,874 | 4/1969 | Cressey et al. . | |
| 3,479,453 | 11/1969 | Townsend . | |
| 3,497,744 | 2/1970 | Himmelbauer et al. . | |
| 3,573,789 | 12/1971 | Sharp | 340/728 |
| 3,693,181 | 9/1972 | Marshall et al. . | |
| 3,737,914 | 6/1973 | Hertz . | |
| 3,752,288 | 8/1973 | Detig et al. . | |
| 3,786,478 | 1/1974 | King, Jr. | 340/728 |
| 3,852,772 | 12/1974 | Hecht et al. . | |
| 3,941,051 | 3/1976 | Barrus et al. . | |
| 3,988,728 | 10/1976 | Inoue et al. | 340/748 |
| 4,050,075 | 9/1977 | Hertz et al. . | |
| 4,059,183 | 11/1977 | Hoskins . | |
| 4,116,567 | 9/1978 | San Piero . | |
| 4,159,882 | 7/1979 | Sanders et al. . | |
| 4,194,833 | 3/1980 | Lester et al. . | |
| 4,212,009 | 7/1980 | Adleman et al. | 340/728 |
| 4,213,714 | 7/1980 | Jones et al. . | |
| 4,233,894 | 11/1980 | Barrus et al. . | |
| 4,237,457 | 12/1980 | Houldsworth . | |
| 4,250,502 | 2/1981 | Klauch et al. . | |
| 4,297,022 | 10/1981 | Lester . | |
| 4,314,282 | 2/1982 | Fischbeck et al. . | |
| 4,318,597 | 3/1982 | Kotani . | |
| 4,322,063 | 3/1982 | Fischbeck et al. . | |
| 4,339,208 | 7/1982 | Biedermann . | |
| 4,340,888 | 7/1982 | Seroskie | 340/755 |
| 4,349,828 | 9/1982 | Fischbeck et al. . | |
| 4,360,805 | 11/1982 | Andrews et al. | 340/744 |
| 4,365,549 | 12/1982 | Fotland . | |
| 4,386,349 | 5/1983 | Granberg et al. . | |
| 4,400,791 | 8/1983 | Kitado | 340/728 |
| 4,404,571 | 9/1983 | Kitamura . | |
| 4,408,907 | 10/1983 | Bernardis . | |
| 4,415,889 | 11/1983 | Davis | 340/727 |
| 4,459,051 | 7/1984 | Kawai . | |
| 4,481,509 | 11/1984 | Sasaki et al. | 340/728 |
| 4,513,444 | 4/1985 | Okai et al. . | |
| 4,521,774 | 6/1985 | Murphy | 340/728 |
| 4,533,268 | 8/1985 | Sanders . | |
| 4,684,937 | 8/1987 | Schine | 340/728 |
| 4,703,323 | 10/1987 | Troupes | 340/728 |

FOREIGN PATENT DOCUMENTS

| | | |
|---|---|---|
| 062165 | 5/1981 | Japan . |
| 002769 | 1/1982 | Japan . |
| 047675 | 3/1982 | Japan . |

*Primary Examiner*—Marshall M. Curtis
*Attorney, Agent, or Firm*—Davis, Bujold & Streck

[57] ABSTRACT

A unique intra-dot/inter-dot scanning system which gives superior quality speed performance. The intra-dot and inter-dot scanning system is applicable to both serial and line impact dot matrix printers, line and serial thermal printers, ink jet, laser and LCD printers, as well as computer monitors and television. The scanning is perpendicular to the beam's motion over the tube and one synchronized cycle is completed while the beam travels one-half dot diameter to three dot diameters. In the preferred embodiment, the raster scanning system is a cathode ray tube display having a source of an intensity modified electron beam and a main means for deflecting the beam to create a series of horizontal sweeps of the beam from the top to the bottom of a display screen; the deflection means comprises a secondary means for deflecting the electron beam; and, the driver means comprises signal producing means for applying a repetitive sinusoidal electrical signal to the deflection means.

23 Claims, 8 Drawing Sheets

VERTICAL SCANNING MECHANISM FOR ONE AND TWO PIN PRINTERS

O = 0  FOR SYMMETRICAL SCANNING

O OFFSET FOR PSEUDO SAW-TOOTH SCANNING

ENHANCED RASTER IMAGE PRODUCING SYSTEM

BACKGROUND OF THE INVENTION

This application is a continuation-in-part of application Ser. No. 799,843 filed Nov. 18, 1985.

The present invention relates to raster scanning systems such as dot matrix printer, televisions, CRT monitors, and the like, and, more particularly to an improvement to a raster scanning system having means for selectively creating a series of dots in a series of parallel rows by repeatedly sweeping a dot-producing means across a display medium, wherein the improvement comprises, deflection means for deflecting the dot-producing means in a direction substantially normal to the sweep direction; and, driver means operably connected to the deflection means for cyclically deflecting the dot-producing means in a repetitive pattern during each dot-producing sweep across the display medium.

More particularly, the present invention relates to an improvement to a raster scanning system wherein the raster scanning system is a cathode ray tube display having a source of an intensity modified electron beam and a main means for deflecting the beam to create a series of horizontal sweeps of the beam from the top to the bottom of a display screen; the deflection means comprises a secondary means for deflecting the electron beam disposed following the main means in the path of the electron beam between the source and the display screen; and, the driver means comprises signal producing means for applying a repetitive electrical signal to the deflection means.

Many devices use a so-called "raster" scanning system. These include dot matrix printers and cathode ray tube (CRT) displays such as used in television sets and computer monitors. In any raster device, a dot-producing entity moves across the display area repeatedly on a line-by-line basis. In a printer, it is a printhead moving across the paper. With the CRT, it is an electron beam moving across the phosphors of the CRT screen.

There are two dot matrix principles used in dot matrix printers today. One uses a matrix which is approximately equal to the dot size. The second uses a dot size that is up to ten times larger than the matrix. As used herein, "Matrix" means the spacing between the possible dot positions or the number of possible dot positions per inch horizontally and vertically.

All quality printing by impact dot matrix printers uses a dot size considerably larger than the matrix. While in the draft mode, the dot size and the matrix are usually approximately the same.

Quality printing is generally performed by using a seven to pipe pin printhead and using multiple passes of the printhead while moving the printhead or paper a fraction of a dot between passes (Reference: R. C. Sanders U.S. Pat. No. 4,159,882). Another method currently used is to use eighteen to twenty-four pins arranged in two or three staggered rows. At the same time, the matrix used for firing pins during the horizontal sweep of the carriage is a fraction of a dot width.

Most thermal and laser printers use a dot size equal to the matrix, while ink jet printers have been designed both ways. Most, if not all, CRT monitors use a dot size equal to the matrix size. The new improved CRT monitors will use dot sizes that are equal to the matrix size as well as dot sizes that are much larger than the matrix size.

BRIEF SUMMARY OF THE INVENTION

This invention is based on using a dot size much larger than the matrix size regardless of the type of device. To achieve scanning by a dot matrix printing system according to the present invention, the printing means is moved relative to the recording means with a scanning motion having a major direction and means are provided for imposing on said scanning motion a cyclical variation in the direction of the motion transverse to its major direction. In one preferred form of the invention (intra dot scanning), the cyclical variation completes at least one cycle during a scan equal to the dot size. The cyclical scan has a duration equal to or longer than the dot refire time and an integral number of dots can be created at predetermined points along the cyclical path. In order to minimize confusion, the application of this principle to various types of printers is described separately in the following detailed description. The use of the present invention with CRT monitors is then addressed. Where dimensions and performance capabilities are given, they are by way of example only and reflect tested modifications of actual devices performed by applicant herein.

DESCRIPTION OF THE VARIOUS EMBODIMENTS

Serial Impact Dot Matrix Printer Using Synchronized Intra-dot Scanning

Figure 1:
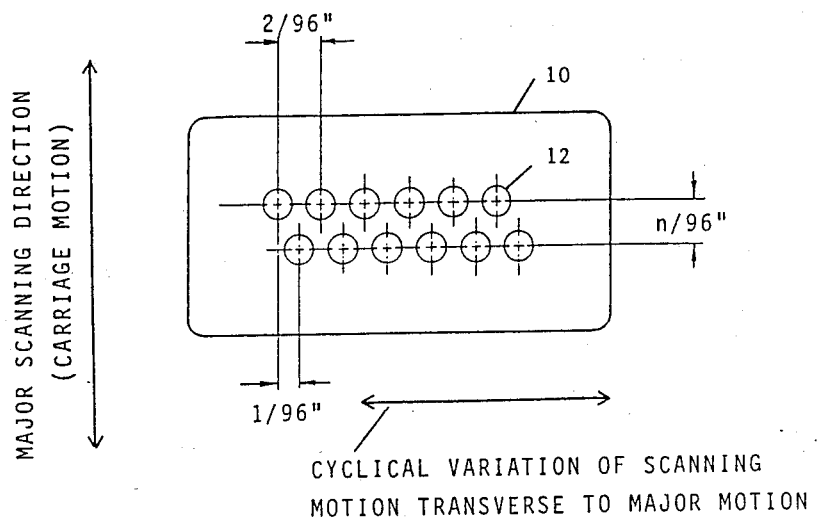
FIG. 1 is an end view of one type of dot matrix printhead that can be used with the present invention.

A twelve pin printhead 10 is used in this first example arranged in two rows of six pins 12 as shown in FIG. 1. The vertical spacing of the pin centers is 1/48" in each row and, due to the staggering, the effective spacing between the pin centers is approximately 1/96". The pin diameter is 1/72" and the dot diameter made on the paper is sixteen mils. If the pin diameter is reduced or increased, it is important to scale the above dimensions as well as to increase or decrease the number of pins in the printhead.

Figure 2:
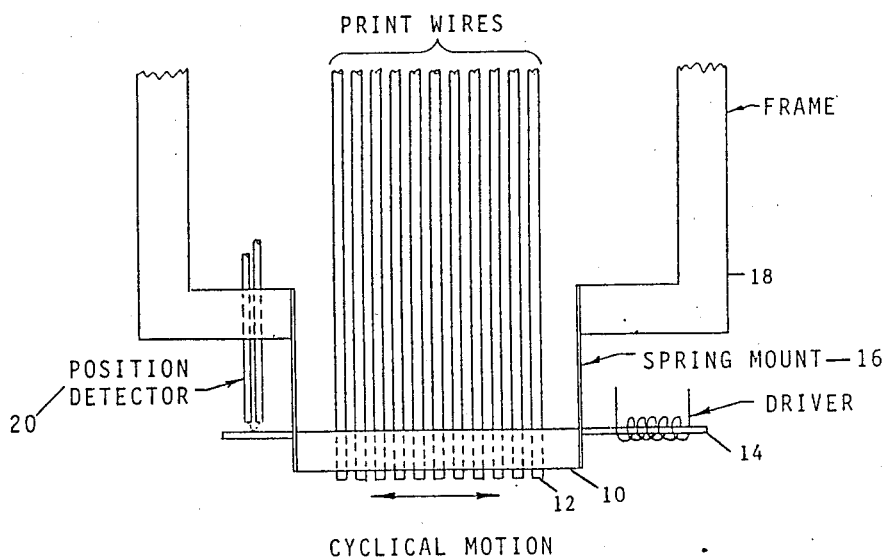
FIG. 2 is a side view of the printhead of FIG. 1 showing the means for oscillating the printhead transversely to the major scanning direction.

The ends of the pins are moved in sinusoidal fashion five mils as the carriage (not shown) is moved horizontally across the paper. Referring to FIG. 2, this motion is created by driver 14 operating on the printhead 10. Since the printhead 10 is supported on a frame 18 by spring means 16, the printhead will oscillate at a frequency controlled by the drive and the spring mount. One cycle is made every time the carriage is moved 1/96" horizontally. The permissible firing points (i.e. the matrix) are approximately ten points equally divided in time for every complete vertical sine wave cycle. This gives a matrix size of 960/inch horizontally and about 300/inch vertically. It should be obvious to one skilled in the art that the intra-dot scanning cycle could be divided into a lesser or greater number of permissible firing points, say six to twenty points. It is important that there be an integral number of firing points per intra-dot scanning cycle.

Figure 3:
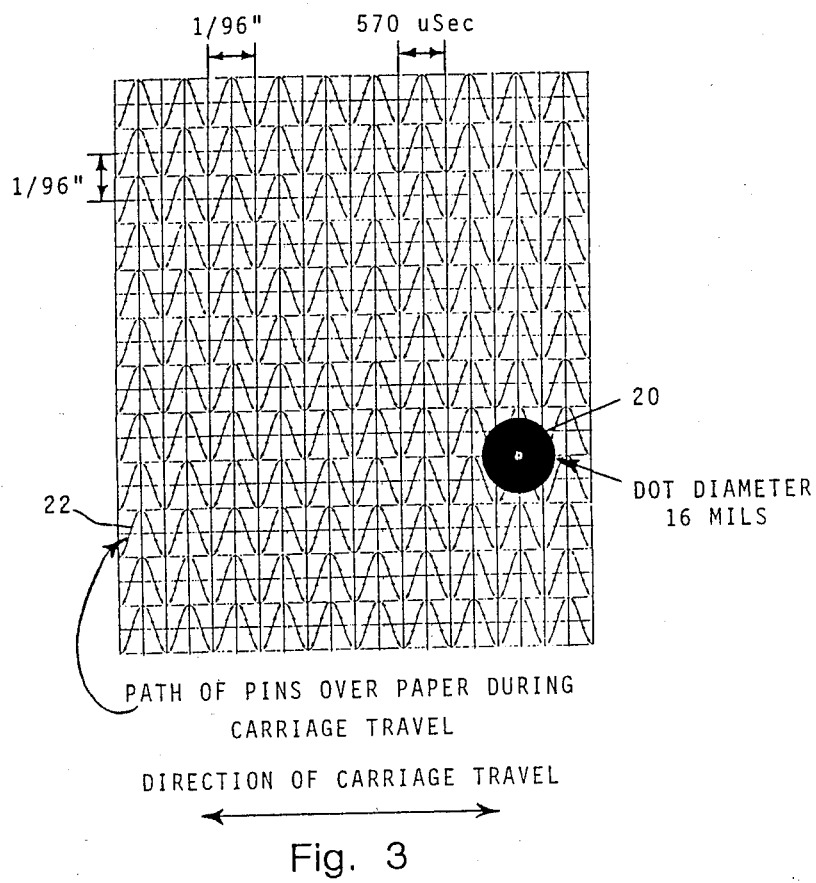
FIG. 3 is an enlarged schematic diagram of the path of the print pins across the paper for the printhead of FIGS. 1 and 2.

The motion of the end of the pins for a twelve pin printhead is shown in FIG. 3. A typical dot as produced by the pins 12 is indicated as 20 while the sinusoidal path traversed by of each of the pins 12 as the carriage moves across the paper is indicated as 22. The carriage speed is adjusted so that the refire time is equal to ¾ of an intra-dot scan cycle for quality printing. If the refire time is 400 microseconds, the carriage speed would be 18.75 inches/second.

Figure 4:
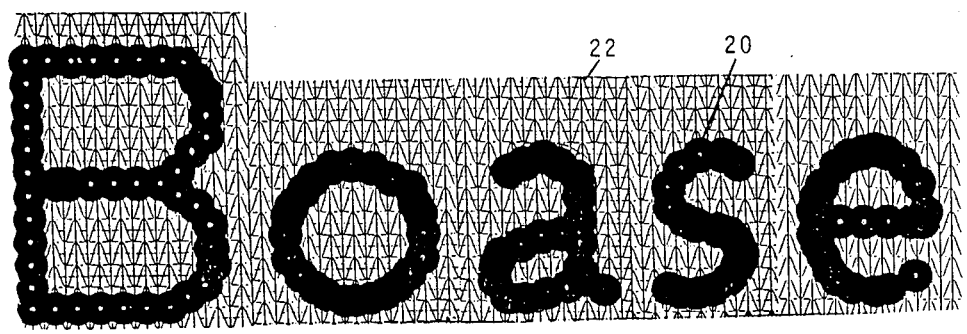
FIG. 4 is an enlarged view of typical type font like characters produced by the printhead of FIGS. 1 and 2 when moved through the path of FIG. 3 according to the technique of the present invention.

FIG. 4 is an enlarged illustration of a word printed with various letters as produced with with the FIG. 3 matrix. One can see by the layout of the dots 20 that the quality is at least as good as four pass, nine pin output. Using a 2500 Hz printhead, the speed of the intra-dot scan printer (twelve pins) would be 187.5 cps (draft speed 500 cps) for the four pass, nine pin printer. The speed advantage is obvious. If these same letters were made with a 2500 Hz eighteen pin printhead with two passes, the speed would be 120 cps (draft speed 500 cps). A 1875 Hz twenty-four pin printhead would give the same speed and almost the same quality.

The advantage of the intra-dot scanning system of the present invention is that it gives the same performance as a twenty-four pin printhead with, of course, far less parts and cost. It gives superior performance to both the nine pin and eighteen pin printhead used in a multipass printing system and does not have the stringent horizontal position indicator requirements. (For additional information see recent R. C. Sanders U.S. Pat. No. 4,533,269.) The intra-dot scanning system need not be sinusoidal, although that or a triangular scan is near optimum and, therefore, preferred in most cases. To obtain a square wave, one preferred method comprises having the paper stationary during the horizontal scan and a stationary printhead during the vertical scan. Obviously, scan waves could be used that lie between the triangular wave and the sine wave and between the sine wave and the square wave.

The verticald scanning motion is given to the end of the pins by moving the printhead 10 supporting the pins 12 plus or minus five mils at a frequency of 1875 Hz. The mounting of the printhead 10 is made resonant at or near 1875 Hz to minimize the driving power. This frequency is derived by subdividing the matrix pulses that determine the matrix points and is phase adjusted so that one of the matrix pulses is synchronized with the top of the sign wave. It is also important that the separation of the two rows of pins 12 is an exact multiple of the 1/96" horizontal motion during a single vertical scan.

Alternately, the entire print mechanism, generally indicated as 24, can be moved so as to give the desired motion to the end of the pins 12 either by rotating the mechanism 24 or moving it vertically as an alternate to moving the printhead 10.

While dot matrix printing using print wires has been described above, the invention is equally applicable to ink jet printers of the type described in "Printout", Vol. VIII, No. 3, March, 1984. In this case the jet nozzle assembly is oscillated to achieve the transverse scanning motion superimposed on the major scanning motion.

Scaling with Dot Size

If the dot size were reduced to twelve mils, the vertical scan would be plus or minus 3.75 mils and the horizontal motion for a vertical scan would be 7.5 mils. This would increase the number of pins to sixteen. If the refire time was then 333 micro seconds, the carriage speed would be 17"/second. The letter quality (LQ) speed would be 170 cps. The design consideration being used is to keep the dot overlap in a 45° line at 1.8 of a dot diameter. Vertical and horizontal lines would have a dot overlap of 3.8 of a dot diameter. Lines at intermediate angles or parts of curves would have dot overlaps that range between 3.8 of a dot and ⅓ of a dot with the fast majority at ⅔ dot diameter overlap. If the dot is reduced to eight mils or below, it is not necessary to overlap the dots. Between eight and twelve mil dots, the amount of overlay needs to be determined empirically.

Effective Matrix Size

The effective matrix size of the example of FIG. 3 is 960/inch horizontally and somewhat variable in the vertical direction, but worst case is 300/inch vertically. This is somewhat better vertically than a twenty-four pin head (216/inch vertically) and equivalent to four pass, nine pin printing (288/inch vertically).

It is relatively easy to increase the matrix definition with no reduction in printing speed and only minor penalties in electronic cost by doubling the number of firing points. This gives a matrix size of 1920/inch horizontally and 600/inch vertically. The only limitation to increasing the definition with synchronized intra-dot scanning or multipass printing is that the dot size is the minimum line width.

Alternate Vertical Size Scan

There is an improved variation of the invention if deflection of the scan is increased to plus or minus 10 mils. The matrix then can be increased to twenty points per cycle. This gives a matrix size of 1920/inch horizontally and 480/inch vertically. This provides a hybrid inter-dot and intra-dot scan. Using this technique, the possible matrix points are a lot more uniform. When printing letter quality, the carriage speed can be increased to 25"/second because of the increased interleaving. The refire time of 400 microseconds is one complete vertical scan. This increases the letter quality speed to 260 cps for ten pitch and 325 cps for proportional Times Roman.

When the carriage is speeded up to 41.6 ips with plus or minus 10 mils deflection, a matrix size that is 960/inch horizontally and 480/inch vertically can be achieved. This is a pure inter-dot scan in both directions. The only limitation is that there is a reduced number of vertical positions (i.e., two) that can print horizontal lines. One must therefore reduce the point size of near letter quality (NLQ) or increase the number of pins by one or two pins.

When the speed is increased up to 83.2 ips, a matrix size of 480/inch horizontally and vertically is achieved. 48 dpi draft characters which would be printed at 832 cps (ten pitch) have a quality which is about the same as conventional 48 dpi draft characters. The only limitation is the reduced number of vertical positions that can print horizontal lines. One must either reduce the point size of draft letters or increase the number of pins.

In summary, using a triangular scan with plus or minus 10 mils, letter quality is obtained at 260 cps (ten pitch) and 325 cps (proportional). This is a four to one improvement over conventional four pass printing. Near letter quality is obtained at 416 cps (ten pitch) and 520 cps (proportional), a three to one improvement. A 48 dpi draft at 830 cps (ten pitch) gives a 1.8 to 1 improvement. This also minimizes the registration problems of multipass printing and is, therefore, a significant improvement for that reason alone.

As can be seen, the complete scanning cycle is longer than the dot diameter (inter-dot scanning). However, this embodiment shares with the intra-dot scanning system the common point of novelty of the present invention, i.e., a transverse scan imposed on the major scanning motion. When using inter-dot scanning, it is necessary to have the scanning cycle complete within about three or four dot diameters; otherwise, the ability to achieve desired quality of printing will be lost. Preferably, the inter-dot scanning is complete within one and one-half to two cycles.

The few minor disadvantages of this embodiment are as follows: The printhead is twelve pins rather than nine pins. Additionally, one actuator is needed for vertical scanning. Thus, there is an added cost of four pins and the associated pin drivers. Due to the higher pin tip velocity, there is also slightly higher dot position uncertainty and dot elongation.

There is an extension of the inter-dot scanning as described above. By changing the angle of the transverse pin motion to slightly off vertical, the generally triangular path over the paper previously described can be changed to a sawtooth path. This works for either direction of carriage travel, although there would be minor changes in the font depending on the direction of carriage travel. Just which is more desirable in a given printer design depends on the detailed printer specification.

Figure 5:
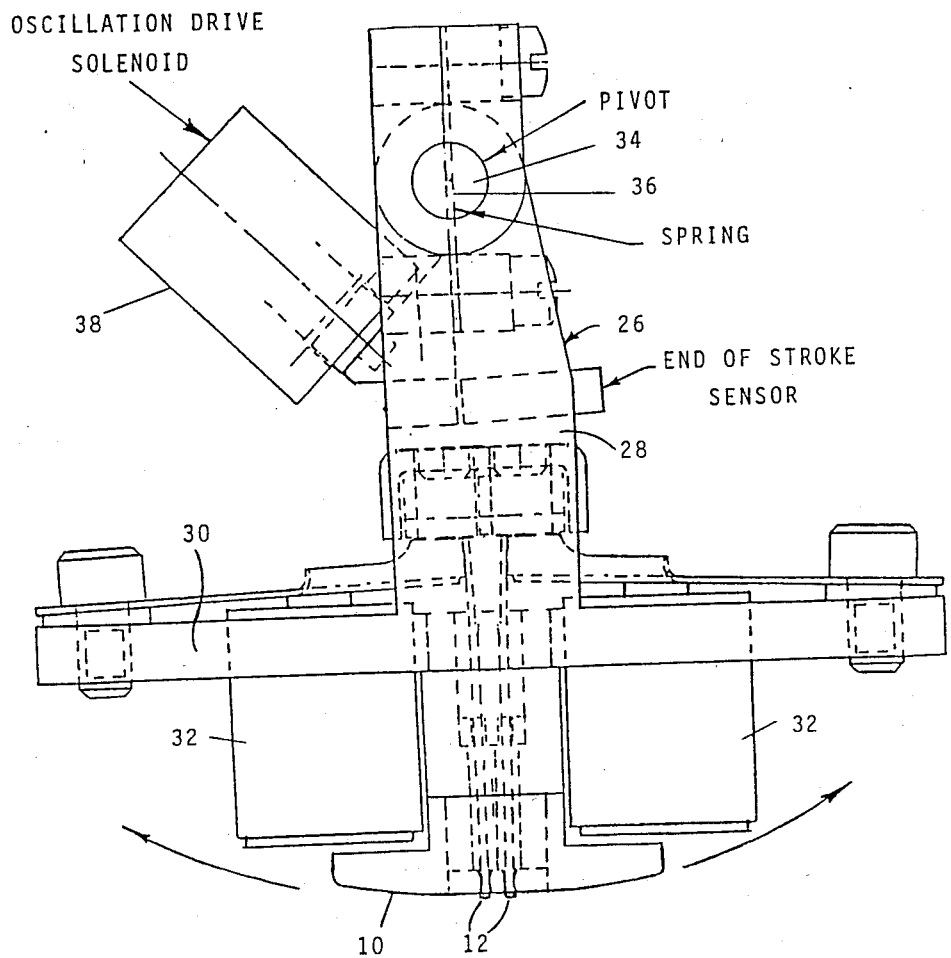
FIG. 5 is a side view of a vertical scanning mechanism for one and two pin printers employing the present invention.

FIG. 5 shows the preferred vertical scanning mechanism, generally indicated as 26, to be used on one and two pin printers, and the like. A T-shaped member 28 has the printhead 10 mounted to the crossmember 30 of the "T". Also mounted thereto are two spring-biased solenoids 32 used to drive the two print pins 12. The other end of the member 28 is mounted to pivot pin 34 with torsion spring 36 passing through the pin 34 to bias the member 28 to a neutral position from which it can be oscillated in either direction (i.e., up and down) by the drive solenoid 38. The whole scanning mechanism 26 is oscillated by the drive solenoid 38 to oscillate the print head 10 to move the pins 12. As mentioned above, to create a sawtoothed scanning path, the pivot pin 34 is positioned slightly off of horizontal to make the plane of oscillation of the print head 10 slightly off vertical. Tests have shown that with one pin, one can achieve speeds of 44 cps draft, fourteen cps LQ and that a two pin printhead can achieve print speeds of 104 cps draft, 28 cps LQ (ten pitch) and 35 cps LQ (proportional).

A four pin printhead is really a hybrid cross between the intra-dot scanning and the extra-dot scanning of the one and two pin printers. Here, one can achieve 156 cps draft, 52 cps LQ (ten pitch), and 65 cps LQ (proportional). The mechanism for vertical scanning could be as shown and described above.

Also possible is a six pin printer with plus or minus twenty mil vertical scanning. The print speed achievable with this approach is 234 cps draft, 78 cps LQ (ten pitch) and 97 cps (proportional). The scanning again is a somewhat different hybrid from the four pin scanning.

Serial Thermal Printer Using Synchronized Intra-dot Scanning

A serial thermal printer would be implemented in a very similar fashion to the serial impact dot matrix printer as described above. Several examples of such printers that can be modified in accordance with the present invention are shown on page 3 of the Kyocera brochure "Thin Film Thermal Printheads", CAT/1T8504FTK/2192E, and page 4 of "Printout", Vol. VII, No. 12, December, 1983 as well as "Printout", Vol. IX, No. 9, September, 1985. The design of the printhead 10 of FIG. 1 can be modified for use with a thermal printer with twelve printing elements in place of the pins 12 being mounted in two rows of six with the element centers twenty mils apart and staggered so that the effective element spacing is ten mils with the vertical sinusoidal scanning being plus or minus 5 mils with a carriage motion of ten mils and the printing elements producing a dot of sixteen mils diameter (the "dot" could, of course, also be square or other convenient shapes even though a round dot is shown in the figures). The intra-dot scanning could be triangular, square wave or any shape in-between, but sinusoidal or triangular is nearly optimum and, therefore, preferred. Assuming the refire speed was six milliseconds, the carriage speed would be 13 inch/second. The printing speed for high quality letters (ten pitch) would be 130 cps, which would be the same as a thirty-six pin printhead. The savings would be in using a twelve pin printhead with the resulting elimination of the associated element drivers and electronics. In the case of a thermal printhead, however, the entire printhead would need to be rotated or moved vertically to obtain the desired scanning motion.

Line Thermal Printer or Electrostatic Printer Using Synchronized Intra-dot Scanning A line thermal printer utilizes synchronized intra-dot scanning by imparting a sinusoidal horizontal motion to the printhead as the paper is fed vertically, thus giving the desired path to the printing elements. The printing elements would be two rows of printing elements. An example of such a line thermal printer that could be modified in accordance with the present invention is shown on pages 4 and 5 of the above-mentioned Kyocera brochure. The printing elements would produce a dot sixteen mils in diameter (or square, etc. as mentioned above). The effective spacing of the printing elements is ten mils and the paper advances ten mils through one sinusoidal cycle. The effective matrix of such a configuration is 300/inch horizontally and 1000/inch vertically.

Assuming the refire speed is eight milliseconds, the paper speed would be 1"/second and the print speed would be 360 lines/minute. The savings would be the reduction in printing elements from 2000-4000 elements to 1000 elements for a 10" printline.

Electrostatic Printer

An electrostatic printer according to the present invention operates in much the same way as the previously described devices; that is, the printhead oscillating horizontally as the paper moves vertically. An example of such a printer that could be modified in accordance with the present invention is shown in Versatek Bulletin No. 525-2, April, 1984, describing its V-80 printers. The printhead would have a sinusoidal motion as the paper is fed vertically. The printing elements would produce dots of sixteen mils in diameter. The effective spacing of the printing elements is ten mils and the paper advances ten mils through one sinusoidal cycle. The effective matrix is 300/inch horizontally and 1000/inch vertically. The intra-dot scanning could be triangular, square wave or almost any shape in-between, although sinusoidal or triangular is, again, nearly optimum and, therefore, preferred. The major saving would be the reduction in elements and their associated drivers from 2000-4000 elements and drivers to 1000 elements.

Impact Dot Matrix Line Printer Using Intra-Dot Scanning

Intra-dot scanning can improve letter quality printing by a factor of two over conventional methods in addition to improving the vertical matrix size. Using the technique, draft printing is nearly doubled. Also, the intra-dot scanning allows the printer to compensate for continuous paper motion eliminating the rapid paper motion at the end of each shuttle motion. This is accomplished by modifying the matrix patterns to take into account continuous paper motion. Different character PROMS are used for each character position and directions (only four combinations in a sixty-eight pin printer). When this feature is used, throughput is increased as much as 50%. For example, a sixty-eight pin (13.6" line length) printer could print 2300 lines/minute while a twelve pin (8" line length) printer could print 730 lines/minute. It also greatly reduces the cost of the paper handling mechanism in the printer.

Laser Printers Using Synchronized Intra-dot Scanning

In the case of a laser printer employing the present invention a technique similar to that employed with a CRT display (to be described shortly) is used; that is, the beam is deflected vertically as the beam is swept horizontally so the beam makes a sinusoidal track across the drum. An example of such a printer that can be modified to utilize the present invention is shown in "Printout", Vol. IX, No. 6, June, 1985 and "Printout", Vol. IX, No. 5, May, 1985. If the dot size were ten mils, the modulation would be such that the beam deflected plus or minus 3.5 mils vertically while the beam was moving horizontally 1/144". The beam could be deflected by a vibrating mirror in the light path. In such case, the effective matrix would be 1500/inch horizontally by 480/inch vertically.

The advantage of this method is that a larger size laser beam can be used, which could result in faster printing by a factor of two or three times. The intra-dot scanning could be triangular, square wave or almost any shape in-between although sinusoidal is nearly optimum and, therefore, preferred.

Light Emitting Diode (LED) or Liquid Crystal Diode (LCD) Printer

In LED (or LCD) printers (such as produced by Ricoh or IBM), synchronized intra-dot scanning would again provide an advantage. An example of such a printer that could be modified in accordance with the present invention is shown in "Printout", Vol. IX, No. 10, October, 1985. Two rows of LED's (or LCD's) are employed. Each LED or LCD makes a dot on the drum of sixteen mils diameter and the effective spacing is 1/96". The path the LED or LCD elements make on the drum is due to a sinusoidal motion imparted to the LED or LCD elements that move plus or minus 5.0 mils sinusoidally as the drum moves 1/144". The effective matrix is 480/inch horizontally and 1500/inch vertically.

The advantage of this over conventional LED or LCD printers is that it uses one-third or one-fourth the LED or LCD elements that the conventional LED or LCD printers use for the same matrix definition. The printing speed would be increased by a factor of two or three. The intra-dot scanning could be triangular, square wave or almost any shape in-between although sinusoidal is nearly optimum and, once again, therefore, preferred.

Application to Imaging Systems

While the present invention has been described initially in the context of its use in dot matrix printing, the basic principals and points of novelty involved can be utilized equally in image scanning as well as image printing, as will now be discussed.

Scanner for Graphic Input to Synchronized Intra-dot Scanning Printers

In order to input graphic data into synchronized scanning printers, it is necessary to scan the graphic data in exactly the same way as the dots are printed.

Scanner for Serial Dot Matrix Printer or Serial Thermal Printer Using Synchronized Intra-dot Scanning In this case, the scanning head consists of twelve elements arranged in the same manner as the pins 12 in the printhead 10 of FIG. 1. In the scanning case, the elements would be photo diodes, for example, rather than print pins. The elements are made to move vertically sinusoidally as the head moves horizontally so that the head scans plus or minus five mils as the head moves 1/96" mils horizontally. The scanning could be accomplished mechanically by moving or rotating the scanning head; or, it could be done optically.

During the scanning, the effect is to pick up horizontal lines as the scanner is moving vertically and vertical lines as the scanner moves horizontally. This type of scanner thus has a matrix definition of 960/inch horizontally by 300/inch vertically.

The intra-dot (or inter-dot) scanning must be identical to that used in printing. Commercial optical scanning systems which could be modified to utilize the present invention are described in Ricoh Bulletin, IS30, NO. 8506-TA-8506, 8401, April, 1984.

Scanner System for Line Thermal or CCD Printer Using Synchronized Intra-dot Scanning In this case, the scanning head should match the printhead both in geometry and motion. As a result, the scanning elements should be as previously shown and the motion should be as previously described for the applicable associated printhead.

Converting Standard Raster Graphics to Synchronized Intra-dot Scanning Format Assuming that standard raster graphics are in sufficient detail to warrant it, the conversion to synchronized intra-dot scanning format can be made as part of a software program. Basically, the method is as follows: The standard raster graphics (with a dot size to match the matrix size) is put into a bit map window which progresses as the processing is completed. The software moves a larger dot (as used in synchronized scanner format) through the bit map on a scanning path that matches the synchronized scanning format until a match is obtained. So, basically, the software does what was proposed in the physical scanner in the two previous paragraphs. In the same way, it is possible to convert from intra-dot scanning to inter-dot scanning.

Facsimile System Using Synchronized Intra-dot Scanning

This system uses a synchronized scanner for transmitting and a synchronized scanner printer for reception. A good combination would be the synchronized scanner described above with the thermal line printer. The major advantage is an increase in matrix definition (resulting in letter quality output) with increased printer speed and no increase in transmission time using a modified group 3 or 4 compression system. (For description of such compression system, reference should be had to EIA standards).

Computer Monitor Using Synchronized Inter- and Intra-dot Scanning

As mentioned earlier herein, the present invention is as applicable to CRT type displays as it is to printing on paper. In fact, it is in this area that the present invention has, perhaps, its greatest potential. Such use will now be described.

Figure 6:
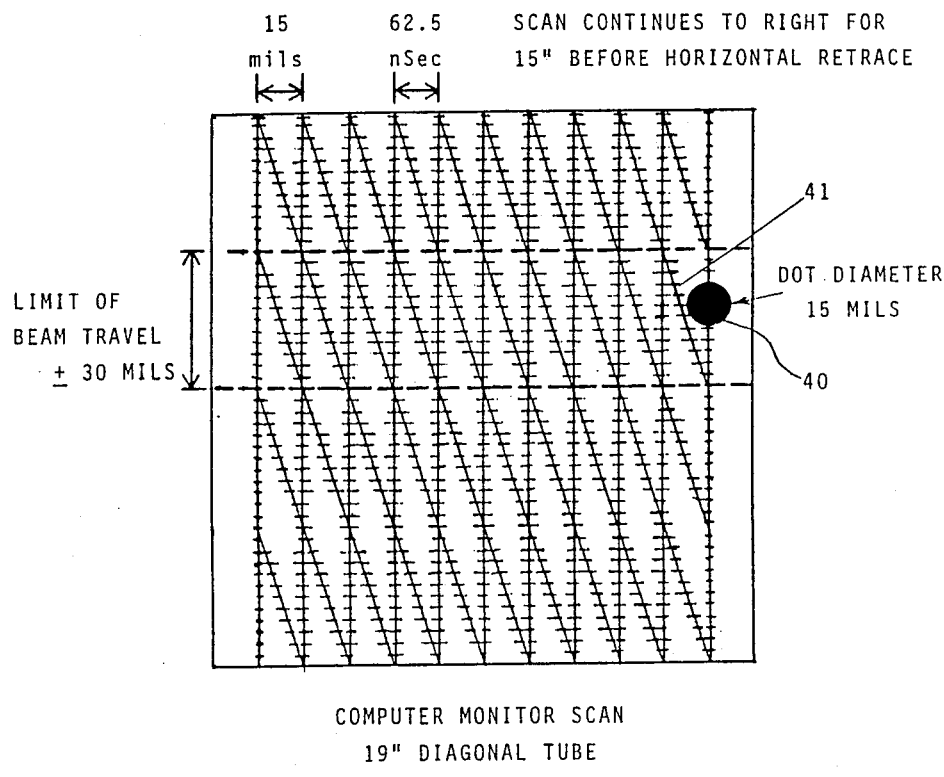
FIG. 6 is an enlarged schematic diagram of the path of the electron beam scan in a CRT for a 19" computer monitor when operated according to the present invention.
Figure 6A:
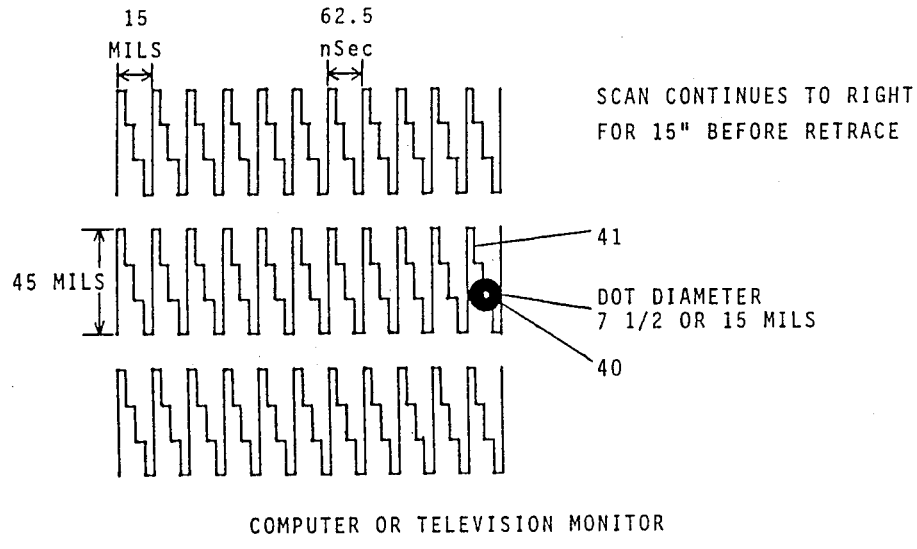
FIG. 6A shows the path of the electron beam scan using a stepped square wave modulation.

The electron beam is vertically deflected as it scans horizontally as shown in FIG. 6. Assuming a spot size of fifteen mils with a spacing between scans of sixty mils, in moving along its path 41, the electron beam 40 would be deflected sinusoidally plus or minus thirty mils while the beam was moving horizontally fifteen mils. The vertical beam deflection shown in FIG. 6 is a sawtooth. This could very well be accomplished by a sinusoidal deflection that was tilted to give a sawtooth-like path. A sinusoidal vertical deflection will give very similar results. An alternate preferred method is shown in FIG. 6a using stepped square wave modulation which provides be the luminance uniformity. The horizontal scan frequency is 15.6 KHz with about a ten millisecond retrace. The vertical scanning frequency is sixteen MHz. The beam deflection of plus or minus thirty mils gives a non-interlaced display. This requires a sixty-four MHz video. The result is a 1024×860 display.

In using an interlaced display, the vertical deflection is reduced to plus or minus fifteen mils. This reduces the video to thirty-two MHz and the result is still a 1024×860 display.

By increasing the dot access frequency (consequently decreasing memory access time) the matrix definition in both directions is increased. Thus, with a sixty-four MHz dot access frequency, the result is a 2048×1720 display using interlaced scanning, although minimum line width remains fifteen mils; however, the increased matrix size will permit letter quality fonts of the same quality as shown in FIG. 4 and eliminate the "jaggies" in diagonals and curved lines in the graphics mode.

Inter- and Intra-dot Scanning

Figure 7:
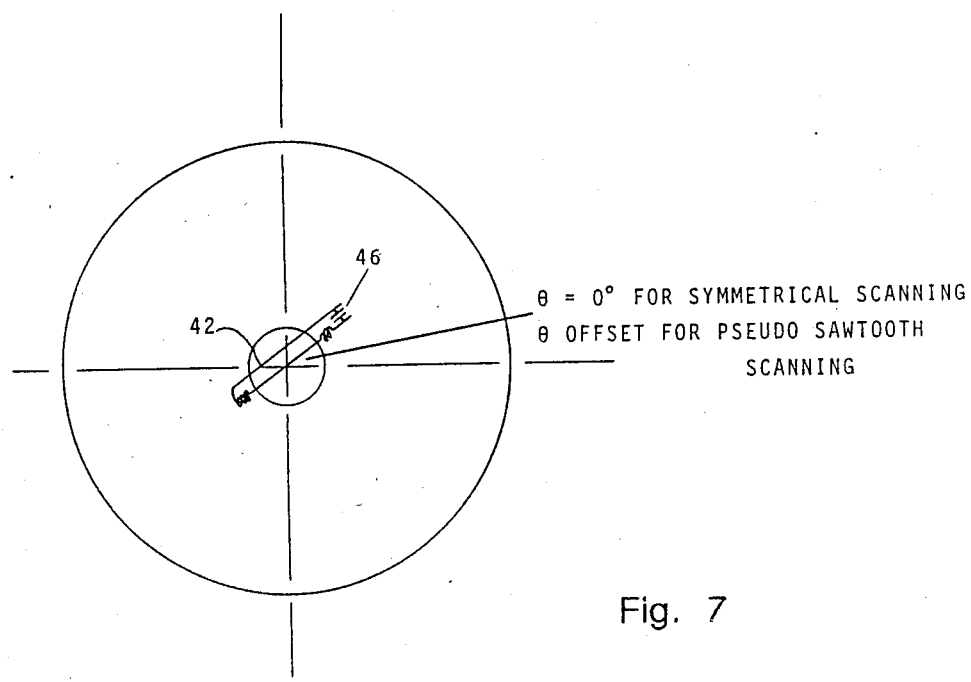
FIGS. 7 and 8 are front and top views, respectively, of a magnetic CRT adapted to operate according to the present invention.
Figure 8:
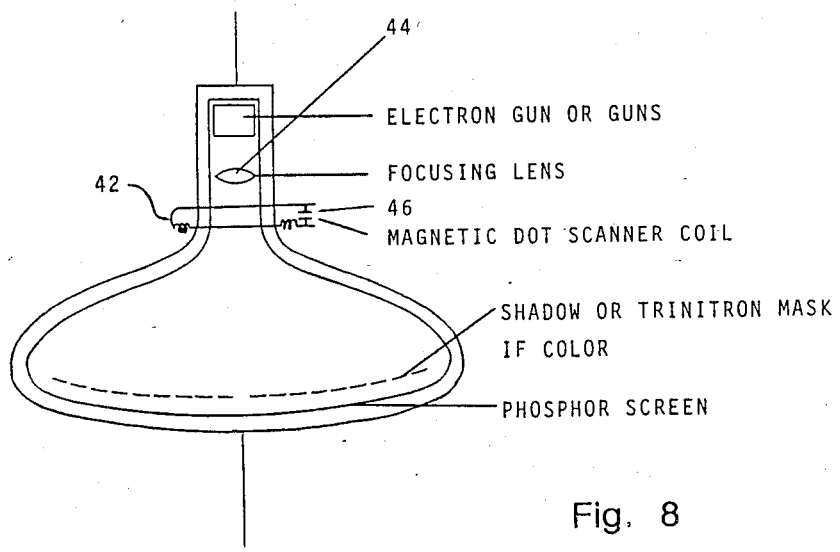
Figure 9:
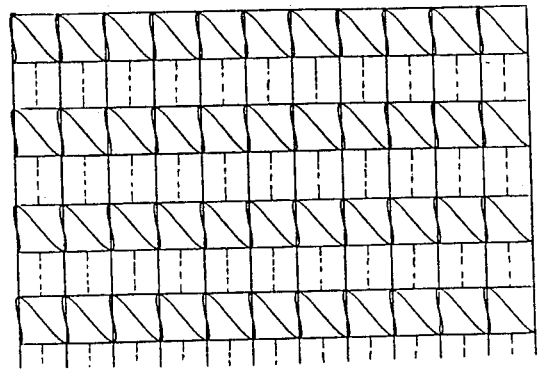
FIG. 9 is an enlarged schematic diagram of the path of the electron beam scan in a CRT according to the present invention when using offset deflection to obtain pseudo sawtooth scanning.

Inter- and intra-dot scanning in a CRT can be accomplished either magnetically or electrostatically, depending of the type of CRT employed. If magnetically, a separate small deflection coil 42 is mounted immediately after the electronic lens 44. It is preferable to resonate the coil 42 with a capacitor 46 at the vertical scanning rate as illustrated in FIGS. 7 and 8. It is not efficient to use the vertical deflection coils (not shown) of the CRT itself. The coil 42 is mounted horizontally if sine waves are desired and off horizontal if pseudo-sawtooth scanning as shown in FIG. 9 is desired. The angle from horizontal (θ) is picked to match the horizontal scanning rate.

Figure 10:
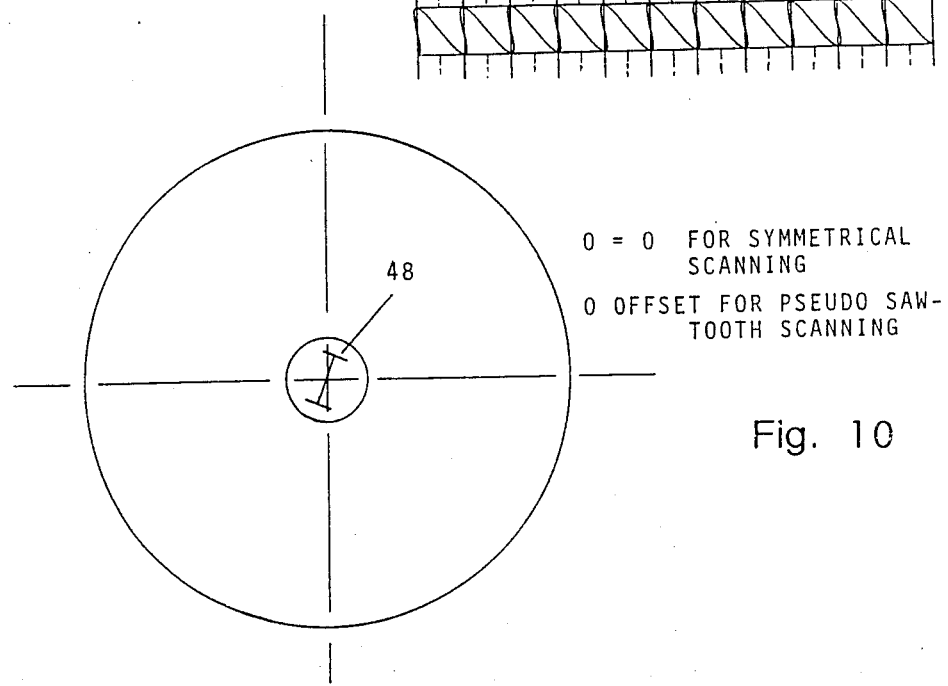
FIGS. 10 and 11 are front and side views, respectively, of an electrostatic CRT adapted to operate according to the present invention.
Figure 11:
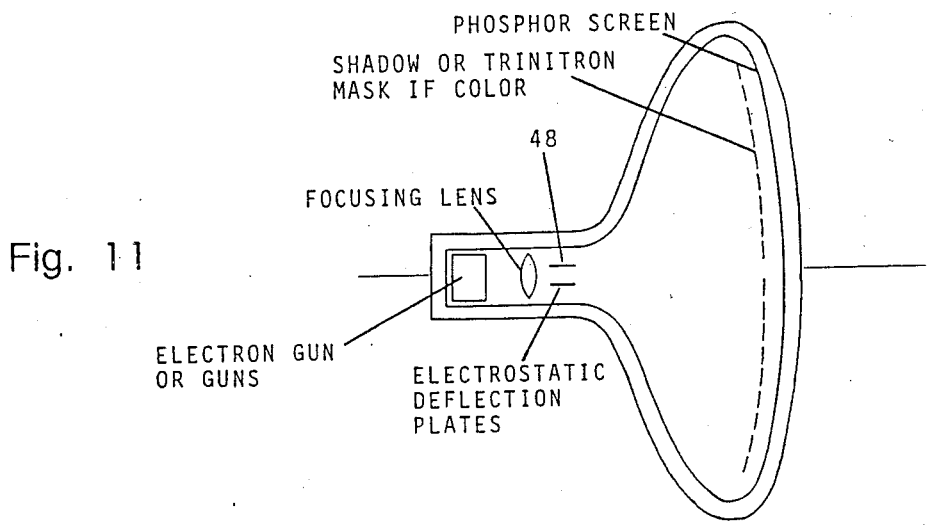
Figure 12:
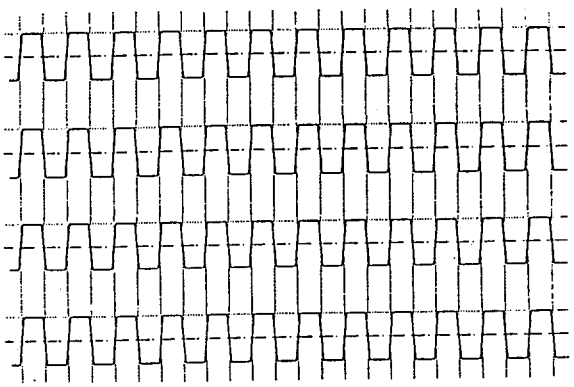
FIG. 12 is an enlarged schematic diagram of the path of the electron beam scan in a CRT according to the present invention when using a clipped sine wave with electrostatic deflection to obtain pseudo square wave scanning.

A preferable way to obtain inter-and intra-dot scanning in an electrostatic CRT is to use small electrostatic deflection plates 48 immediately after the electronic focusing lens 44 as shown in FIGS. 10 and 11. These plates 48 are placed vertically if sinusoidal scanning is wanted, or off vertical if pseudo-sawtooth scanning is the desired result. FIG. 12 illustrates pseudo-square wave scanning if the sine wave driving the electrostatic plates is limited. This scanning is useful in some applications.

High Definition Pictures (TV)

If the picture is scanned in the same way as the monitor, definition of the resulting images can be improved in the same fashion. This could be very useful in all the cases where current TV standards are not involved. For example: photographic images of all types, closed circuit TV, map projections, etc.

Vertical Definition Enhancement (Apparent) of Television Picture

A television picture is produced every one-thirtieth of a second by scanning each alternate line on a television tube (CRT) during the first one-sixtieth of a second (i.e., one-half of the picture); and, during the subsequent one-sixtieth of a second, scanning the lines intermediate those scanned in the previous one-sixtieth, with the second half of the picture. This is a well-known and much-used technique known as "interlacing".

To improve the apparent vertical definition, it is desirable to scan all lines every one-sixtieth of a second.

The blank intermediate scan lines could then be filled in by memorizing a preceding line, comparing the data in that memory with the succeeding line, and then filling in the intermediate line with averaged, interpolated, or otherwise derived infomation. A simple, less effective method normally employed simply repeats the scan line twice.

There is much interest in improving the quality of ordinary TV as transmitted by today's standards. The major opportunity for quality improvement results from eliminating the above-described interlace, which causes problems when the human eye moves vertically (saccades) over the picture. For example, if you store an entire frame including the interlace, combine the two, and then put the combined picture on the tube at approximately 60 Hz, you obtain a much better quality picture. The major disadvantage of this is the expense. Storing an entire frame and combining it is still expensive to do electronically. Doubling the horizontal scan frequency is also expensive.

Another method that has been tried is to store one scan line and then repeat the stored scan line in the interlaced line below. This gives improvement, but not as much as the case where you combine the entire frame. Further, it is still relatively expensive because you must still double the horizontal scan frequency.

Using inter-dot scanning in various forms, one can duplicate or come close to these above-described improvements; but, in a much less expensive way. The present invention achieves this not by doubling the horizontal scan to produce a complete picture every one-sixtieth of a second; but, by a technique derived from inter-dot scanning in which the scanning electron beam is caused to oscillate vertically with an amplitude equal to the space between adjacent scan lines and equal to the electron beam diameter producing the trace. By this means, the electron beam can produce picture information for one scan trace directly from the broadcast signal while on the peaks of its vertical oscillation and from derived information from the preceding and succeeding scan lines while in the troughs of the oscillation. In this way, a single scan can produce adjacent scan traces simultaneously, with the electron beam being modulated to vary the intensities as described.

The derived, intermediate signal may be generated by storing, on the fly, one line of scan information and comparing the signal from the output of the store with the signal on the input of the store (the store being dynamic in that the stored information proceeds serially from the input to the output, i.e. a FIFO store) and deriving intermediate scan information from this. Hence, the compared information will always be of signals synchronized vertically from preceding and succeeding scan lines.

The vertical oscillation of the electron beam may be of a sawtooth form whereby the scan line information of the preceding and intermediate scan lines are synchronized vertically one above the other essentially at the top and bottom of the vertical of the sawtooth form. The oscillation may be produced by the techniques of FIGS. 7 and 8 or FIGS. 10 and 11, as previously described in detail. More detailed explanations will now be provided.

Method 1—Modest Picture Improvement

Figure 13:
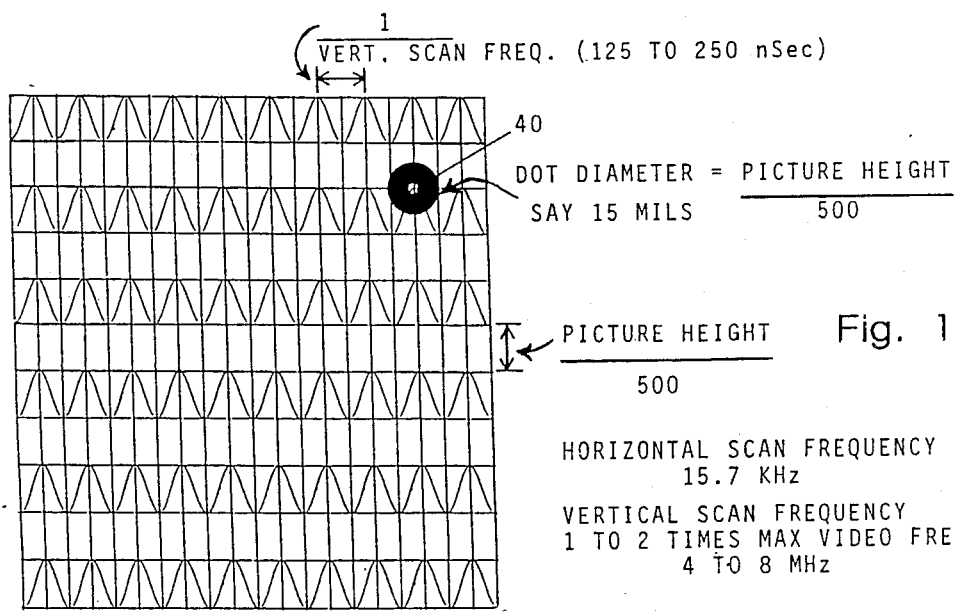
FIG. 13 is an enlarged schematic diagram of the path of the electron beam scan in a CRT according to the present invention during horizontal scan with fractional scan shown.

Vertically scan the electron beam 40 sinusoidally as in FIG. 13 plus or minus one-half dot diameter at twice the maximum video frequency (say seven to ten MHz). This produces a dot that is the same spot size horizontally, but twice as high vertically. Other than this, leave the monitor the same as before. This does the same thing as storing one scan line and repeating the scan line in the interlaced line below. However, it does not need to store a line nor does it double the horizontal frequency. The disadvantage of this scheme is that the top and bottom horizontal lines will act as follows. Assume top of horizontal contrast shift starts on an interlaced line. Extending down the non-interlaced line above gives no intensity where there should be such. The interlaced frame line gives the proper intensity. So, the net result is that the top of horizontal edges are at one-half of proper intensity and blinking at the thirty Hz interlace rate. The same effect takes place at the bottom of the horizontal edge. The diagonal edges develop a sort of fuzzy/jaggy effect for the same reason. This technique will, however, fill in vertical lines. The apparent improvement takes place because much less of the picture is blinking at the thirty Hz interlace rate.

Method 2—Increased Picture Improvement

Vertically scan the beam sinusoidally as in FIG. 13 plus or minus one-half diameter at the maximum video frequency in a synchronized manner during the horizontal scan. Store one scan line on a CCD chip (such as the Fairchild CCD321A). Derive the interlace line by averaging the first and second interlaced lines. Combine the original and the derived interlaced line so that a video synchronized signal that records the first line and the first interlaced line on the face of the tube in one horizontal scan is obtained. This process is repeated for the entire frame for one sixtieth of a second. When the interlaced frame comes up, the foregoing process is repeated. The superimposed picture resulting therefrom should be much improved.

Just how much better the picture actually is depends on the quality of the interpolation between the two scans. The simplest scheme is to average the intensity of adjacent vertical pixels. The disadvantage of this scheme is similar to Method 1, described above. The effect on horizontal and diagonal lines is the same as Method 1, except the edge intensity is three-fourths of the proper value (as opposed to one-half); and, it still blinks at the interlace rate of thirty Hz.

Method 3—Maximum Picture Improvement

Figure 14:
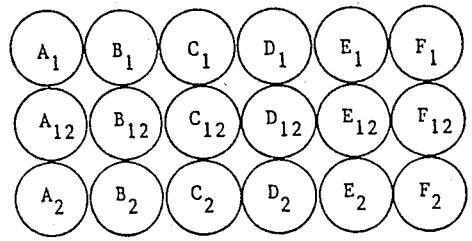
FIG. 14 is a diagram of a group of adjacent pixels in a CRT.

The best technique is to compare three adjacent horizontal pixels on one scan with three adjacent horizontal pixels immediately below on the second scan as shown in FIG. 14. If pixel B1 is the same intensity as pixel B2, we make B12 the same intensity. If B1 and B2 are not the same intensity, we make B12 the average of the two intensities unless A1 intensity is the same as C2, in which case we make B12 the same intensity as A1 or C2. In a similar manner, if A2 is the same intensity as C1, we make B12 the same intensity. The advantage of this method over Method 1 is that most diagonal edges are continued almost perfectly. Horizontal fuzziness should be about the same as Method 2.

Inter-horizontal Scan Interpolating

Figure 15:
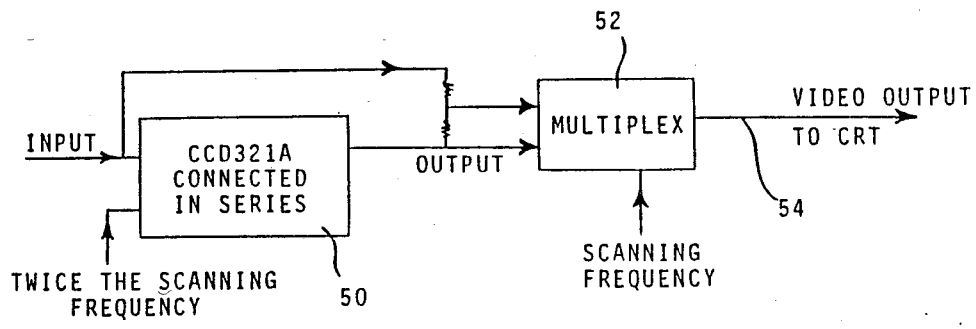
FIGS. 15 and 16 are block diagrams of circuits according to the present invention for interpolating between horizontal scans in a CRT.
Figure 16:
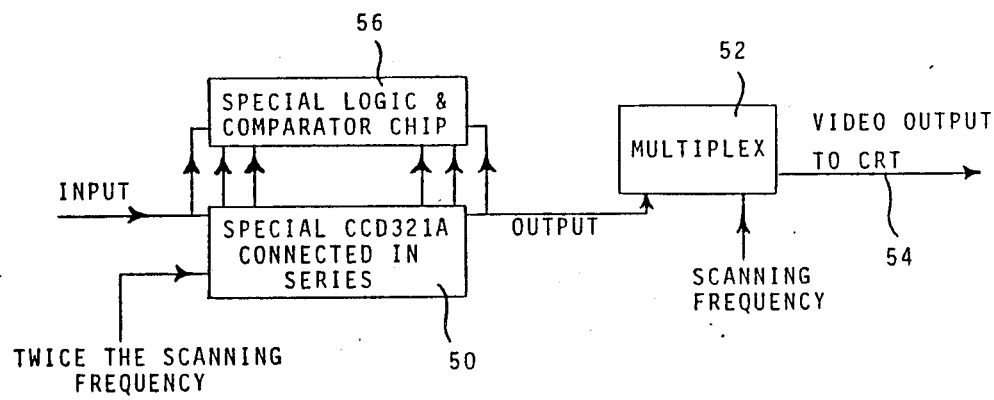

In Methods 2 and 3, special circuitry is needed to interpolate between horizontal scans. FIGS. 15 and 16 show in block diagram form two circuits that could be employed to perform this interpolation. FIG. 14 shows a CCD321A chip 50 connected with a multiplexer 52 to provide the video signal synchronized with the vertical pseudo-square wave scanning for Method 2. The CCD321A chip 50 is connected in series mode providing 910 bits of analog shift register. After one horizontal sweep is stored in the CCD321A, the timing signals are such that the corresponding bit of the subsequent horizontal scan signal is going into the CCD321A as the corresponding bit of the previous horizontal scan signal is going out of it. By averaging the corresponding bits, one can obtain the interpolated interlaced signal that is desired. The video signal to the CRT at 54 is the resulting of the multiplexer 52 multiplexing between the previous horizontal scan signal and the interpolated interlaced signal at the inter-dot scanning frequency. It should be noted that when using this technique, the signals appear on line 54 to the CRT one horizontal scan line late.

To accomplish Method 3, the more complicated circuit shown in in FIG. 16 must be used. In this case, a special modified CCD321A chip 50 which makes available the first three bits of the incoming signal and the last three bits in memory is used. Here, again, the timing is such that there are three corresponding bits of two adjacent horizontal scan signals. These are fed to a special logic chip 56 which includes three comparators and which includes logic to perform the steps of Method 3. The output is again multiplexed by the multiplexer 52 at the scanning frequency and fed to the CRT on output line 54. Here, again, the picture displayed is one scan line late.

Color Television—Special Considerations

Projection TV

Projection TV using three tubes of different colors will operate as described above as there are no complications of color shadow masks or trinitron aperture grilles.

Shadow Mask Color Tubes

In order to make sure that we don't have to match the vertical scan with the shadow mask holes, we must use a vertical scanning frequency twice the frequency which the horizontal scan intercepts the shadow mask. This insures that the beams hit the mask as well as they do without any vertical scanning. Its disadvantage is that the final video amplifier must be quadruple the bandwidth and the beam current must be larger to compensate for the shorter time the beam is in the shadow mask. If we use the pseudo-square wave scanning (requiring electrostatic deflection as in FIGS. 10 and 11) as illustrated in FIG. 12, we minimize the increase in beam current required. With double the shadow mask frequency, we get half the beam current on the phosphor in one horizontal scan as compared to the current if we were not inter-dot scanning; however, since we paint each line twice as often, the beam current required remains about the same.

Trinitron Type Color Tubes

When using a trinitron type color tube, the inter-dot scanning frequency should be equal to twice the frequency at which the horizontal scan intercepts the aperture grill. Pseudo-square wave modulation as in FIG. 12 should also be used again. Once again, we get half the beam current on the phosphor in each horizontal scan; but, because we have twice the scan, there is no appreciable increase in beam current required.

Wherefore, having thus described my invention, I claim:

1. A raster scanning system comprising:
    (a) means for repeatedly sweeping an image producing means across a display medium to produce a series of sweeps for the creation of visual images in said series of sweeps;
    (b) deflection means for cyclically deflecting the image producing means in a direction substantially normal to the sweep direction in a repetitive series of like oscillations throughout each image producing sweep across the display medium;
    (c) means for controlling the image producing means to vary the brightness of pixels created;
    (d) means for supplying a first image information signal synchronized with said repetitive series of oscillations to control said controlling means to produce visual image information on said display medium at one set of desired corresponding locations on each of desired ones of said oscillations during a said sweep; and
    (e) means for supplying at least a second image information signal synchronized with said repetitive series of oscillations to control said controlling means to produce visual image information one said display medium at another set of desired corresponding locations on each of desired ones of said oscillations during the said sweep.

2. A raster scanning system according to claim 1 where said oscillations are contiguous throughout each image producing sweep.

3. A raster scanning system according to claim 1 wherein the display medium is a cathode ray tube, the image producing means is an intensity controllable electron beam, the sweeping means deflects the beam to produce a series of parallel sweeps of the beam across the display screen of the cathode tube, the deflection means comprises a secondary means for deflecting the electron beam disposed following said sweeping means in the path of said electron beam between the source and the display screen, and the controlling means controls the intensity of the electron beam.

4. A raster scanning system according to claim 3 wherein the first and second image information signals have an effective video frequency equal to the frequency of said oscillations.

5. A raster scaning system according to claim 3 wherein the osciallation comprise one of a clipped sine, sine, square or saw-tooth wave form.

6. A raster scanning system according to claim 2 wherein the oscillation amplitude (peak to peak) is equal to the spacing between adjacent raster sweeps.

7. A raster scanning system according to claim 4 wherein said electron beam produces a series of dots to form said visual images and the amplitude of said oscillations is substantially equal to the diameter of said dots produced by said electron beam.

8. A raster scaning system according to claim 1 comprising a FIFO (first in first out) storage means for serially storing one scan line of an incoming video signal and the output of said storage means provides said first image information signal while a simultaneous input to said storage means provides a said second image information signal.

9. A raster scanning system according to claim 1 comprising a FIFO (first in first out) storage means for serially storing one scan line of an incoming video signal and a logic means for comparing the output from the storage means with the simultaneous input thereto to provide a derived signal which forms the first image information.

10. A raster scaning system according to claim 9 wherein said desired first image information signal controls the controlling means to form an interlace line between the lines of an interlaced raster currently being scanned while the input to said storage means comprises the second image information signal to form a line of the interlaced raster currently being scanned and next adjacent said interlaced line.

11. A raster scanning system according to claim 10 comprising multiplexing means combining said first and second image information signals to produce a video synchronized signal to control said controlling means whereby said image producing means will create a line and an interlace line on said display medium during each horizontal scan.

12. A cathode ray tube display such as a computer monitor, television, or the like including a raster scanning system having a source of an intensity controllable electron beam and a main means for deflecting the beam to create a series of horizontal sweeps of the beam from the top to the bottom of a display screen for selectively creating a series of pixel dots in a series of parallel rows comprising:
 (a) deflection means for deflecting the dot-creating means in a direction substantially normal to the sweep direction;
 (b) drive means operably connected to said deflection means for cyclically deflecting the dot-producing means in a repetitive pattern throughout each dot-producing sweep across the display medium, said driving means comprising a signal producing means for applying a repetitive electrical signal to said deflection means to produce a peak to peak amplitude of said pattern which is equal to the spacing between horizontal sweeps; and
 (c) means for providing an image information signal synchronized with said repetitive pattern to control said intensity controllable electron beam to generate two parallel image lines for each said sweep.

13. A raster scanning system according to claim 3 wherein said first image information signal is a received signal and said second image information signal is a derived signal.

14. A raster scanning system according to claim 2 wherein the oscillation amplitude, peak to peak, is greater than the spacing between adjacent raster sweeps.

15. A raster scanning system according to claim 14 wherein the oscillation amplitude, peak to peak, is approximately double the spacing between adjacent raster sweeps.

16. A raster scanning system according to claim 14 wherein the oscillation amplitude, peak to peak is approximately four times the spacing between adjacent raster sweeps.

17. A cathode ray tube display such as a computer monitor, television, or the like including a raster scanning system having a source of an intensity controllable electron beam and a main means for deflecting the beam to create a series of horizontal sweeps of the beam from the top to the bottom of a display screen for selectively creating a series of pixel dots in a series of parallel rows comprising:
 (a) deflection means for deflecting the dot-producing means in a direction substantially normal to the sweep direction;
 (b) drive means operably connected to said deflection means for cyclically deflecting the dot-producing means in a repetitive pattern throughout each dot-producing sweep across the display medium to allow production of a derived interlace raster or sweep pattern, said driving means comprising a signal producing means for applying a repetitive electrical signal to said deflection means to produce a peak to peak amplitude of said pattern which is equal to the spacing between horizontal sweeps.
 (c) storage means for storing a scan line of an incoming video signal;
 (d) logic means for producing a derived interlace video signal from the incoming video signal; and
 (e) means for combining the incoming and derived signals to produce a video synchronized signal that displays a line and a derived interlace line on the display screen for each horizontal scan.

18. A raster scanning system according to claim 1 wherein the means for repeatedly sweeping produces an interlaced raster scan and the oscillation amplitude (peak to peak) is equal to the spacing between a current sweep and the next adjacent interlace sweep.

19. A cathode ray tube display according to claim 12, wherein the means for creating a series of horizontal sweeps produces an interlaced raster scan and the oscillation amplitude, peak to peak is equal to the spacing between a current sweep and the next adjacent interlace sweep.

20. A cathode ray tube display according to claim 17 wherein the means for creating a series of horizontal sweeps produces an interlaced raster scan and the oscillation amplitude, peak to peak is equal to the spacing between a current sweep and the next adjacent derived interlace sweep.

21. A raster scanning system according to claim 2 wherein the oscillation amplitude (peak to peak) is approximately three quarters of the spacing between adjacent raster sweeps.

22. A raster scanning system according to claim 2 wherein the oscillation amplitude (peak to peak) is approximately one half the spacing between adjacent raster sweeps.

23. A raster scanning system comprising:
 (a) means for repeatedly sweeping an image producing means across a display medium to produce a series of sweeps for the creation of visual images in said series of sweeps;
 (b) means for controlling the image producing means to vary the brightness of pixels created;
 (c) deflection means for generating a first and a second parallel image line for each said sweep by cyclically deflecting the image producing means in a direction substantially normal to the sweep direction in a repetitive series of like oscillations throughout each image producing sweep across the display medium;
 (d) means for supplying a first image information signal synchronized with said repetitive series of oscillations to control said controlling means to produce visual image information on said display medium at at least one desired location on each of desired ones of said oscillations to produce said first of said image lines; and
 (e) means for supplying at least a second image information signal synchronized with said repetitive series of oscillations to control said controlling means to produce visual image information on said display medium at at least another desired loation on each of desired ones of said oscillations to produce said second of said image lines.

* * * * *